(12) United States Patent
Nishida et al.

(10) Patent No.: US 6,899,957 B2
(45) Date of Patent: May 31, 2005

(54) ANTIREFLECTION FILM

(75) Inventors: Mitsuhiro Nishida, Tokyo (JP); Shingo Ohno, Tokyo (JP); Masato Yoshikawa, Tokyo (JP); Nobuko Kato, Tokyo (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/987,971

(22) Filed: Nov. 16, 2001

(65) Prior Publication Data

US 2002/0127408 A1 Sep. 12, 2002

(30) Foreign Application Priority Data

Dec. 28, 2000 (JP) ........................................ 2000-401155

(51) Int. Cl.$^7$ ............................................... B32B 27/14
(52) U.S. Cl. ...................... 428/480; 428/1.5; 428/1.51; 428/323; 428/697; 428/702
(58) Field of Search ................................. 428/1.5, 1.51, 428/323, 480, 697, 702

(56) References Cited

U.S. PATENT DOCUMENTS

| 5,665,422 A | * | 9/1997 | Endo et al. ............... 427/163.1 |
| 5,909,314 A | * | 6/1999 | Oka et al. .................... 359/582 |
| 5,925,438 A | * | 7/1999 | Ota et al. .................... 428/141 |
| 6,329,041 B1 | * | 12/2001 | Tsuchiya et al. ............ 428/195 |

\* cited by examiner

*Primary Examiner*—Terrel Morris
*Assistant Examiner*—Andrew T Piziali
(74) *Attorney, Agent, or Firm*—Manabu Kanesaka

(57) ABSTRACT

An antireflection film is formed of an organic film, and a hard-coating layer, a high refractive index layer and a low refractive index layer laminated in this order on the organic film. The high refractive index layer is formed of metal oxide particles of ITO with electrical conductivity and $TiO_2$ with high refractive index, and synthetic resin. A volume percentage of the $TiO_2$ particles to a total volume of the $TiO_2$ and ITO particles in the high refractive index layer is 1 to 60%, and a volume percentage of the metal oxide particles to a total volume of the metal oxide particles and the synthetic resin is 20% or more.

5 Claims, 1 Drawing Sheet

ANTIREFLECTION FILM

FIELD OF THE INVENTION

Figure 1:
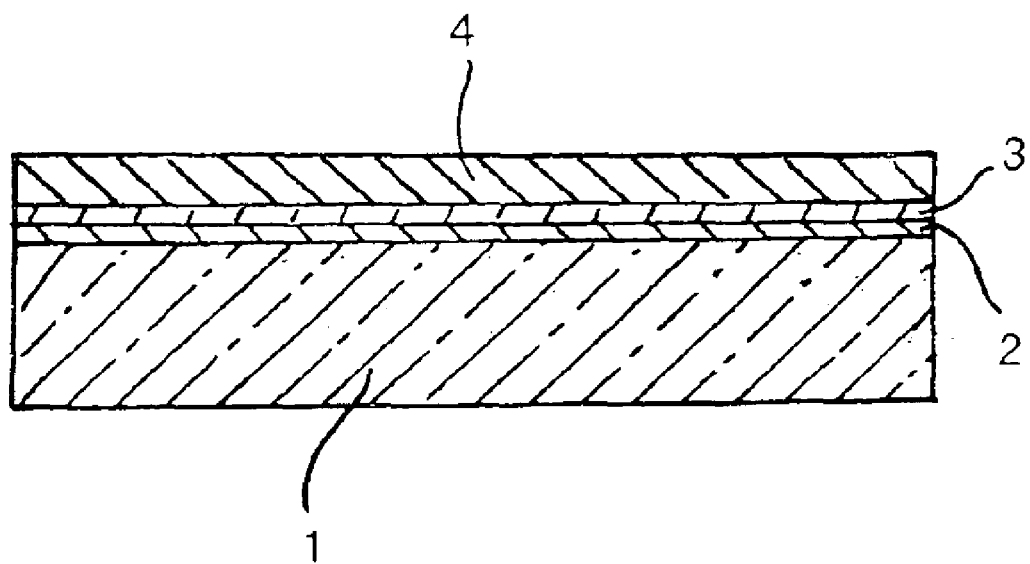

The present invention relates to an antireflection film for preventing optical reflection.

BACKGROUND OF THE INVENTION

An antireflection film can be mounted on a plasma display panel, a liquid crystal display panel, window glass of a vehicle and a building, and the like.

A conventional antireflection film consists of an organic film, a high refractive index layer, and a low refractive index layer, in which these layers are laminated on the surface of the organic film. The conventional antireflection film prevents optical reflection by utilizing a difference in refractive index between the high refractive index layer and the low refractive index layer. As examples of the high refractive index layer and the low refractive index layer, an inorganic thin film laminated by sputtering or evaporation, and a synthetic resin thin film are known. The synthetic resin thin film laminated by coating is inexpensive.

An antireflection film having antistatic properties does not become dirty easily because the film does not absorb dust and dirt by static electricity. A high refractive index layer including particles of electrically conductive metal oxide prevents an antireflection film from static electrification.

The refractive index of the particles of electrically conductive metal oxide, generally, is not so high that it is hard to raise the refractive index of the high refractive index layer up to 1.7 or more. In case that the refractive index of the high refractive index layer is not high enough, it is necessary to reduce the refractive index of the low refractive index layer sufficiently in order to bring down the minimum surface reflectance of an antireflection film sufficiently, e.g., to bring down that to 1% or less, because the antireflection film acquires the anti-reflecting properties by utilizing the difference in refractive index between the high refractive index layer and the low refractive index layer.

Fluorine-based acrylic resin and silicone resin, each of which has a low refractive index, are conventionally used as a material for the low refractive index layer, but these are expensive. The fluorine-based acrylic resin has poor adhesive properties, and the silicone resin has poor chemical resistance, particularly has poor alkali resistance.

OBJECT AND SUMMARY OF THE INVENTION

The object of the present invention is to provide an antireflection film having a high refractive index layer which has an exceedingly high refractive index.

An antireflection film of the present invention is composed of an organic film, a hard-coating layer, a high refractive index layer and a low refractive index layer, in which these layers are laminated on the surface of the organic film, in that order. The high refractive index layer includes at least two kinds of metal oxide particles, and at least one kind of the metal oxide particles are electrically conductive.

The high refractive index layer has an exceedingly high refractive index, and has electrically conducting properties provided by the particles of electrically conductive metal oxide. The electrically conducting properties provide antistatic properties for the antireflection film. The high refractive index layer having an exceedingly high refractive index permits the antireflection film to employ the low refractive index layer having a relatively high refractive index.

BRIEF DESCRIPTION OF THE PREFERRED EMBODIMENTS

FIG. 1 is a sectional view showing an embodiment of an antireflection film of the present invention.

DETAILED DESCRIPTION OF THE PREFERRED EMBODIMENTS

The antireflection film shown in FIG. 1 is composed of an organic film 1, a hard-coating layer 2, a high refractive index layer 3 and low refractive index layer 4, in which these layers 2, 3, and 4 are laminated on the organic film 1 in that order. The high refractive index layer 3 includes particles of electrically conductive metal oxide, thereby providing antistatic properties for the antireflection film.

The organic film 1 preferably is a transparent synthetic resin film, which can be made of polyester, polyethylene terephtalate(PET), polybutylene terephtalate, polymethyl methacrylate(PMMA), acrylic resin, polycarbonate(PC), polystyrene, cellulose triacetate, polyvinyl alcohol, polyvinyl chloride, polyvinylidene chloride, polyethylene, ethylene-vinyl acetate copolymers, polyurethane, cellophane, or the like. The organic film 1 preferably is a transparent film made of PET, PC, or PMMA.

The organic film 1 may have a thickness of 1 $\mu$m to 10mm.

The hard-coating layer 2 preferably is made of synthetic resin, which preferably is ultraviolet ray curable resin or electron beam curable resin, more preferably is multifunctional acrylic resin. The hard-coating layer 2 may have a thickness of 2 to 20 $\mu$m.

The hard-coating layer 2 may include particles of electrically conductive metal oxide to be described later, so that the hard-coating layer 2 can be provided with antistatic properties.

The high refractive index layer 3 includes at least two kinds of metal oxide particles, and at least one kind of the metal oxide particles is electrically conductive. The electrically conductive metal oxide preferably is at least one selected from the group consisting of ITO, ATO, $Sb_2O_3$, $SbO_2$, $In_2O_3$, $SnO_2$ and ZnO. The metal oxide other than the electrically conductive metal oxide preferably is at least one selected from the group consisting of $TiO_2$, $ZrO_2$, $CeO_2$, $Al_2O_3$, $Y_2O_3$, $La_2O_3$3, $LaO_2$ and $Ho_2O_3$, each of which has a high refractive index. The high refractive index layer 3, most preferably, includes particles of ITO with electrically conductive properties and particles of $TiO_2$ with a high refractive index.

The high refractive index layer 3 including the particles of ITO having good electrically conductive properties and the particles of $TiO_2$ having a high refractive index has a high refractive index, and also provides excellent antistatic properties for the antireflection film.

The volume percentage of the particles of $TiO_2$ with 1 to 60%, particularly with 20 to 60%, to the total volume of the particles of $TiO_2$ and the particles of ITO provides an exceedingly high refractive index and exceedingly good antistatic properties for the antireflection film.

The high refractive index layer 3 may include synthetic resin, which preferably is ultraviolet-curing resin or electron ray-curing resin, more preferably is acryl-based resin, epoxy-based resin or styrene-based resin, most preferably is acryl-based resin.

In the high refractive index layer 3, the volume percentage of the metal oxide particles to the total volume of the metal oxide particles and the synthetic resin is in a range preferably of 20 to 100%, more preferably of 30 to 80%, and most preferably of 40 to 60%.

The high refractive index layer 3 preferably has a thickness of 75 to 90 nm.

The low refractive index layer 4 is made preferably of synthetic resin, more preferably of ultraviolet-curing resin or electron ray-curing resin.

The high refractive index layer 3 having a high refractive index permits the antireflection film to employ the low refractive index layer 4 having a relatively high refractive index. In case of an antireflection film comprising a low refractive index layer 4 having a refractive index, for example, of 1.45, the low refractive index layer 4 having a minimum surface reflectance of 1% or less may be made of acrylic resin having a refractive index of about 1.51, which is inexpensive and is excellent in chemical resistance, weatherability, durability and adhesive properties.

The low refractive index layer 4 may be made of silicone resin or fluorine-containing acrylic resin, which will provide a minimum surface reflectance as exceedingly low as 0.5% or less for the antireflection film.

The low refractive index layer 4 may include particles in an amount of 10 to 40% by weight, which improves reduction of the refractive index of the antireflection film, resistance to scuffing and slipperiness of the film. The particles are composed preferably of silica or fluorine-containing resin. The low refractive index layer 4 preferably has a thickness of 85 to 110 nm.

The antireflection film comprising the high refractive index layer 3 having a refractive index of 1.65 or more, preferably of 1.66 to 1.85, and the low refractive index layer 4 having a refractive index of 1.35 to 1.55 has a minimum surface reflectance of 1% or less. The low refractive index layer 4 having a refractive index of 1.45 or less can provide a minimum surface reflectance of 0.5% or less for the antireflection film.

The low refractive index layer 4 having a refractive index of less than 1.35 will not provide less minimum surface reflectance for the antireflection film. The low refractive index layer 4 having a refractive index of more than 1.55 can not provide antistatic properties for the film sufficiently.

The antireflection film of the present invention has a surface resistance preferably of $5 \times 10^{12}$ $\Omega/\square$ or less, most preferably of $1 \times 10^{10}$ $\Omega/\square$ or less, which provides enough antistatic properties for the antireflection film.

Each of the hard-coating layer 2, the high refractive index layer 3 and the low refractive index layer 4 can be formed in such a manner that the unhardened synthetic resin which may include the particles is laminated on the organic film 1, and after that the synthetic resin is irradiated with ultraviolet rays or electron rays so that the resin is cured. In this procedure, each of the layers 1 thorough 3 may be laminated and hardened one by one, or all three layers may be hardened at one time after all layers are laminated.

The layer of acrylic resin can be formed on the film by wet coating method in which the film is coated with a liquid comprising solvent, such as toluene, and acrylic monomers dissolved into the solvent by a coater such as a gravure coater, after that the film is dried, and then, is irradiated with ultraviolet rays or electron rays, so that the liquid is cured. The wet coating method can make it possible to form layers on the film at high speed, homogeneously, and at low cost. The layers cured by ultraviolet rays or electron rays have sufficiently good adhesive properties and high hardness.

The antireflection film of the present invention is applicable to a front filter of a display panel such as a plasma display panel and liquid crystal display panel, and also applicable to a material for window glass of a vehicle and a special building, yet, of course, it being not limitative to these applications.

Hereinafter examples and comparative examples will be described.

Examples 1–9, Comparative Examples 1–4

A PET film (with a refractive index of 1.65) having a thickness of 188 μm was coated with a coating layer including acrylic resin for the hard-coating layer by wet coating method and was dried, then the PET film was coated with a coating layer for the high refractive index layer over the coating layer for the hard-coating layer, in the same manner, and was dried, and then the PET film was further covered with a coating layer for the low refractive index layer over the coating layer for the high refractive index, layer and was dried.

After that, the PET film was irradiated with ultraviolet rays, so that the coating layers were cured, resulting in an antireflection film comprising the hard-coating layer having a thickness of about 5 μm, the high refractive index layer having a thickness of about 82 nm and the low refractive index layer having a thickness of about 95 nm. The compositions and the refractive indexes of the layers were as follows:

| Composition of the hard-coating layer: | |
|---|---|
| Multifunctional acrylic resin | 100 parts by weight |
| Refractive index | 1.51 |

Composition of the high refractive index layer:

Multifunctional acrylic resin and metal oxide particles (the mixing ratio in each Example and Comparative Example is shown in Table 1.)

| Composition of the low refractive index layer: | |
|---|---|
| Multifunctional acrylic resin | 100 parts by weight |
| Refractive index | 1.51 |

In each Example and Comparative Example, the minimum surface reflectance and the surface resistance of the obtained antireflection film were measured and the results are shown in Table 1.

In each Example and Comparative Example, the chemical resistance of the antireflection film was examined in such a manner that a pad of gauze impregnated with a water solution of 3% NaOH was placed on the antireflection film for a certain period (30 minutes), after that the pad was removed and the film was wiped. The estimation of the chemical resistance of each antireflection film was made by the visual observation and the results are shown in Table 1. In Table 1, the sign "very good" means that the color of the light reflected by the antireflection film was the same before and after the examination, and the sign "good" means that the color of the light reflected by the antireflection film slightly varied before and after the examination, yet the film was considered to be sufficiently practical.

TABLE 1

| | | high refractive index layer | | | | |
|---|---|---|---|---|---|---|
| | | combined metal oxide particles $TiO_2$:ITO (volume ratio) | volume percentage of the combined metal oxide particles [vol. %] (note 1) | minimum surface reflectance [%] | surface resistance [$\Omega/\square$] | chemical resistance |
| Example | 1 | 20:80 | 45 | <1.10 | $6 \times 10^9$ | very good |
| | 2 | 40:60 | 45 | <1.00 | $8 \times 10^9$ | very good |
| | 3 | 60:40 | 45 | <1.00 | $3 \times 10^{12}$ | very good |
| | 4 | 45:55 | 40 | <1.00 | on the order of $10^9$ | very good |
| | 5 | 45:55 | 45 | <1.00 | on the order of $10^9$ | very good |
| | 6 | 45:55 | 55 | <1.00 | on the order of $10^9$ | very good |
| | 7 | 45:55 | 60 | <1.00 | on the order of $10^9$ | very good |
| | 8 | 45:55 | 70 | <1.00 | on the order of $10^9$ | good |
| | 9 | 45:55 | 95 | <1.00 | on the order of $10^9$ | good |
| Comparative Example | 1 | 0:100 | 45 | 1.31 | $5 \times 10^9$ | very good |
| | 2 | 100:0 | 45 | <1.00 | $>10^{12}$ | very good |
| | 3 | — | 0 | about 4% | $>10^{12}$ | very good |
| | 4 | 100:0 | 20 | 1.33 | $>10^{12}$ | very good |

Note 1: A volume ratio of the particles of metal oxide to the total volume of the metal oxide particles and the binder resin.

It is apparent from Table 1 that there can be provided the antireflection film which allows the low refractive index layer to be made of general-purpose acrylic resin, but which is excellent in anti-reflectivity and has antistatic properties, according to the present invention.

As described above, the antireflection film of the present invention is excellent in antistatic properties and comprises a high refractive index layer having a higher refractive index than that of the conventional one. The antireflection film may comprise a low refractive index layer made of acrylic resin, which is inexpensive and excellent in chemical resistance, adhesive properties and wetherability. The low refractive index layer made of acrylic resin can lower the production cost of the antireflection film.

What is claimed is:

1. An antireflection film comprising:

an organic film, a hard-coating layer laminated on the organic film, a high refractive index layer laminated on the hard-coating layer and having a refractive index in a range of 1.65 to 1.85, said high refractive index layer being formed of metal oxide particles of ITO with electrical conductivity and $TiO_2$ with high refractive index, a volume percentage of the $TiO_2$ particles to a total volume of the $TiO_2$ and ITO particles in the high refractive index layer being 1 to 60%, and at least one synthetic resin selected from the group consisting of styrene resin, epoxy resin and acrylic resin, a volume percentage of the metal oxide particles to a total volume of the metal oxide particles and the at least one synthetic resin being 20% or more, and a low refractive index layer laminated on the high refractive index layer and having a refractive index in a range of 1.35 to 1.55, said low refractive index layer being formed of silicone resin or fluorine-containing acrylic resin and further including particles formed of fluorine-containing resin in an amount of 10 to 40% therein by weight to improve reduction of refractive index of the antireflection film, resistance to scuffing and slipperiness of the antireflection film, wherein said antireflection film has a surface resistance of $5 \times 10^{12} \Omega/\square$ or less.

2. An antireflection film as claimed in claim 1, wherein said hard coating layer included electrically conductive metal oxide particles to have antistatic properties.

3. An antireflection film as claimed in claim 2, wherein said volume percentage of the metal oxide particles to the total volume of the metal oxide particles and the synthetic resin is 40 to 60%.

4. An antireflection film as claimed in claim 2, wherein said high refractive index layer has a thickness between 75 and 90 nm, and said low refractive index layer has a thickness between 85 and 110 nm.

5. An antireflection film as claimed in claim 4, wherein said refractive index of the low refractive index layer is 1.45 or less to provide a minimum surface reflectance of 0.5% or less for the antireflection film.

* * * * *